Oct. 28, 1941.  J. A. DARWIN  2,260,660
SLIDE CHANGING APPARATUS
Filed April 26, 1940   5 Sheets-Sheet 1

Inventor
Joseph A. Darwin.

By Cushman Darby Thompson
Attorneys

Oct. 28, 1941.  J. A. DARWIN  2,260,660
SLIDE CHANGING APPARATUS
Filed April 26, 1940   5 Sheets-Sheet 2

Inventor
Joseph A. Darwin.
By
Attorneys

Oct. 28, 1941.   J. A. DARWIN   2,260,660
SLIDE CHANGING APPARATUS
Filed April 26, 1940   5 Sheets-Sheet 4

Inventor
Joseph A. Darwin.

By
Attorneys

Oct. 28, 1941.   J. A. DARWIN   2,260,660
SLIDE CHANGING APPARATUS
Filed April 26, 1940   5 Sheets-Sheet 5

Inventor
Joseph A. Darwin
By
Attorneys

Patented Oct. 28, 1941

2,260,660

UNITED STATES PATENT OFFICE 2,260,660

SLIDE CHANGING APPARATUS

Joseph A. Darwin, East Orange, N. J.

Application April 26, 1940, Serial No. 331,850

30 Claims. (Cl. 88—28)

The present invention relates to improvements in slide changing mechanism adapted for use with projectors, magic lanterns, and the like.

An object of the invention is the provision of means for accommodating slides of different thicknesses and materials.

Another object is to provide a mechanism particularly adapted to accommodate slides having metal casings or frames. This type of slide is universally used at the present time, since it can withstand repeated usage without the necessity of replacement.

I have found, however, from actual experience that the metal frames have certain disadvantages which affect the efficiency of the slide changing mechanism, unless means are employed to compensate for these defects. For instance, the metal frames are usually manufactured in quantity production from sheet metal, and, in many instances, these frames have warped or bellied portions, as well as other projections, which may interfere with the progress of the slides through the slide changing mechanism.

The mechanism of the present invention is of the closed circuit type, including a frame upon which are supported a pair of spaced slide retaining magazines. The frame is also provided with front and rear slide tracks which connect adjacent ends of the magazines, and means are employed for progressively feeding the slides forwardly in the magazines. As each slide reaches the front of its respective magazine, a slide carrier engages the outside edge of the front slide and shifts it transversely of the magazine into its adjacent slide track, whereby the slides are intermittently shifted on the tracks to the other magazine.

I have ascertained that because of the projections or warped portions of the metal frames of the slides, the front slide may become jammed or caught in its adjacent slide as it is being shifted laterally thereof into the slide track. In other words, the front slide may not be free to move transversely of its adjacent slide as it is being shifted into the slide track, either because of these imperfections in its own frame or that of the adjacent slide.

The present invention is designed to eliminate this ojectionable feature by providing means for positively rocking the front slide just prior to its transfer to the slide track. This rocking motion or action is such as to separate each side of the front slide from its adjacent slide, so that it will entirely clear any projection or warped portion on the next slide as it is shifted transversely thereof to the slide track. The rocking action is not only transmitted to the end slide, but also to the adjacent slides in varying degree, whereby the slides as they approach the front of the magazine, will be rocked relative to their adjacent slides, and thereby be free to move into the slide track without jamming or catching on the adjacent slide.

A further object of the invention is to provide an improved pusher mechanism for pushing a slide into the rear end of its respective magazine as it is received from the slide track. This pusher mechanism is particularly designed to take advantage of the resiliency and springiness of metal and paper slide frames, as well as frames of other materials which have these characteristics. I have found that a magazine of slides having metal frames possess such an amount of springiness that it is not necessary to provide a spring means associated with the pusher mechanism for constantly urging said mechanism against the rearmost slide in the magazine. This is also true of slides having paper or cardboard frames. Such frames also have a substantial amount of resiliency and springiness, due primarily to the fact that air penetrates between adjacent slides and forms air pockets. Furthermore, the porosity of the paper frames assists in the springy and resilient action of the slides when acted upon by the pusher mechanism. Due to these characteristics, the slides may be compressed in the magazine to a considerable extent by the pusher mechanism. Because of this, it is not necessary that a predetermined or specific number of slides be placed in a magazine to assure the proper functioning of the pusher mechanism. In other words, the number of slides in one magazine may vary with those in the other magazine, the only requisite being that there be a sufficient number of slides in a magazine to permit the pusher mechanism to transmit the pushing action to the slides at the front of the magazine.

Another object is to provide apparatus which is synchronized with the pusher mechanism for operating the slides carriers to shift the front slides out of the magazines just prior to the operation of the pusher mechanism for inserting slides into the rear end of the magazines.

A still further oject is the provision of means carried adjacent the front of the magazines and above the normal path of the slides for contacting the upper edge of a slide which has been accidentally raised above its normal level, and return the slide to its normal position prior to its movement into the slide track.

Another object is to provide one or more adjustably mounted guide plates adjacent the slide track and constituting abutments for engaging the slides as they move into position to be shifted in the slide track. These plates are capable of being adjusted relative to the slide track to accommodate slides of different thicknesses and to take up any clearance in the slide track which might otherwise permit rattling or lateral movement of the slides as they pass through the track.

Aonther object is to provide magazines which are capable of being easily and quickly inserted and removed from the slide changing frame, thus permitting a new set or series of slides to be expeditiously substituted for a set which has been exhibited.

A further object is the provision of an adjustable spacer which may be placed in a magazine to take the place of a plurality of slides, in the event the operator is not supplied with sufficient slides to entirely fill each magazine.

With the foregoing and other objects in view, the invention will now be more fully described, reference being had to the accompanying drawings, in which.

Referring now to the drawings, the numeral 10 designates generally my slide changing apparatus consisting of a main supporting frame 11, a front auxiliary frame 12, incorporating a front slide track, and a rear auxiliary frame 13 having formed therein the rear slide track of the apparatus. A pair of slide retaining magazines or trays 14 and 15 are detachably supported in spaced relation on the frame 11. The tray 14 will hereinafter be designated as the supply magazine, the tray 15 being the receiving magazine.

The present invention is of the closed circuit type of slide changing mechanism, in which the slides 16 are capable of being continuously moved in a circuit through the mechanism. It will be observed that the magazines 14 and 15 are arranged in spaced parallel relation, and that the frame is constructed to provide an enclosed space or opening. This is to accommodate a projecting apparatus, and since the projector forms no part of the present invention, this is merely shown in dotted lines in Figure 1, in order that the structure of the present machine will not be obscured.

Figures 1, 26:
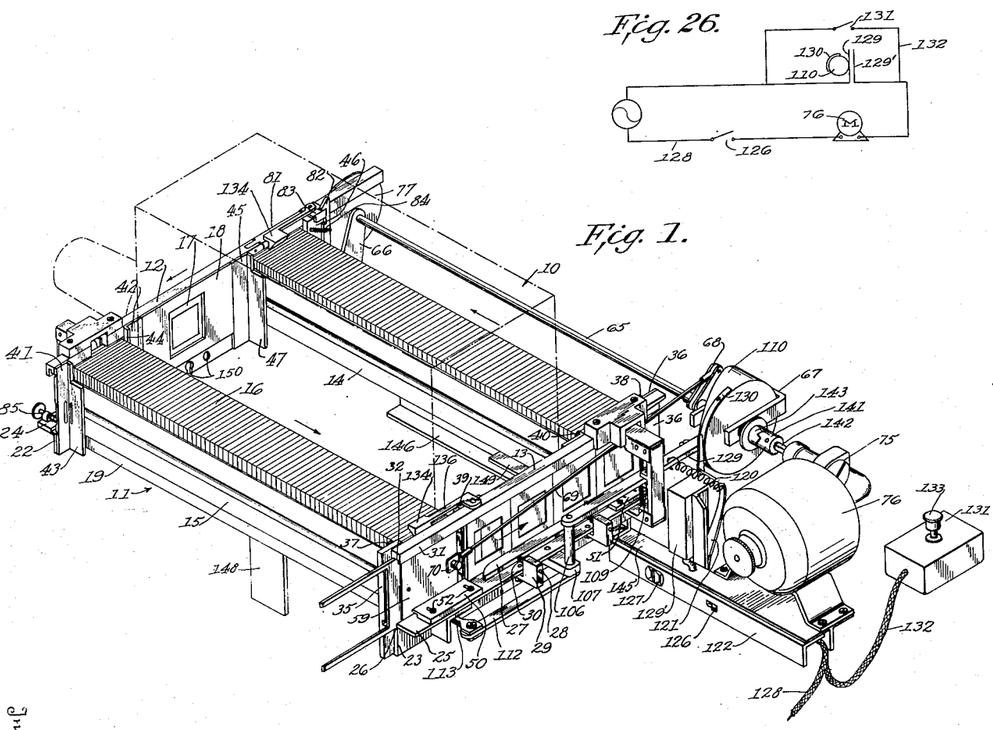
Figure 1 is a perspective view of the complete slide changing machine showing a projector in operative position in dotted lines.
Figure 26 is a diagram of the electrical circuit and switches controlling the operation of the apparatus.

With the present construction, it will also be observed that the movement of the slides in magazine 14 is the reverse of the movement in magazine 15, as indicated by the arrows in Figure 1. That is, during the operation of the machine, the slides will be progressively moved in magazine 14 toward the front slide track 12. The front slide in magazine 14 will be initially shifted into the entrance portion of the front slide track and momentarily maintained in this position. Thereafter the next slide, as it reaches the front of the magazine 14, will be shifted into the slide track, and in so doing, will transmit a further transverse shifting movement to the first slide. As will hereinafter be described in detail, each slide will be shifted to and retained in the front window 17 of the plate 18, where it will be projected onto a screen (not shown) by the projector in the usual manner.

After a slide has been exhibited, the mechanism will continue to shift it laterally in the front slide track until it is in alignment with the receiving magazine 15. Thereafter a suitable pusher mechanism will push the slide into the rear end of the magazine 15, where it will be progressively fed to the front thereof and then shifted into the rear slide track. This operation may be continued until all of the slides in the two magazines have been exhibited. Thereafter the magazines or trays 14 and 15 may be easily and quickly removed from the main frame 11, and another set of trays containing a new series of pictures may be inserted in the apparatus and shifted through the magazines and slide tracks, as above described.

Referring particularly to Figures 1, 2, 3, and 6, it will be observed that the main frame 11 comprises a pair of longitudinally extending frame members or rails 19 of substantially angle iron formation. The top flange 20 of each rail constitutes the supporting surface upon which one of the magazines is directly positioned and supported. The other flange 21 projects downwardly and constitutes the outside border of the main frame extending between the auxiliary frame members and slide tracks.

A pair of cross frame members 22 and 23, also of angle iron formation, have their ends rigidly secured to the end portions of the longitudinal frame members 19 to form therewith a rigid substantially rectangular frame construction. The horizontal flanges 24 and 25, respectively, of the cross frame members 22 and 23, constitute shelves forming the lower portions of the auxiliary frame members 12 and 13.

Figure 2:
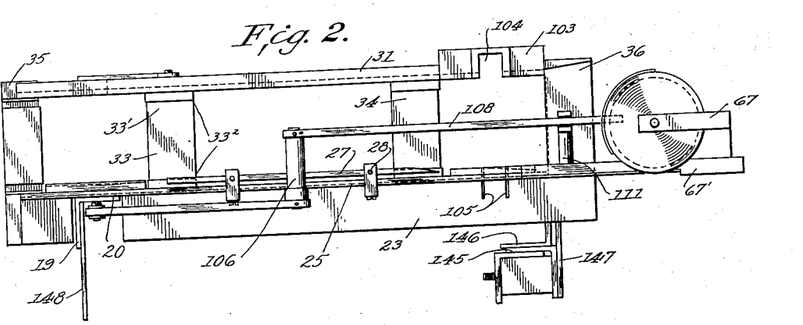
Figure 2 is a view of the rear end of the machine showing the rear slide track.

Referring to Figures 1 and 2, there is disclosed in detail the rear frame 13 within which is mounted the rear slide track connecting the front of the receiving magazine 15 and the rear of the supply magazine 14. As stated above, the horizontal shelf 25 constitutes the lower portion of frame 13 and is provided with a longitudinally extending groove 26 constituting the lower portion of the rear slide track. This groove extends entirely across the rear of the frame section 13. The inner wall of this groove is broken away at the point where it overlaps the magazines. In other words, the base of the groove is flush with the bases of the magazines to permit the slides 16 in magazine 15 to be moved out of the magazine into the groove, so as to be in position to be shifted laterally through the groove to magazine 14. Likewise, the inner wall of groove 26 is eliminated at the point where the groove crosses the magazine 14. This is to permit the slides to be pushed into the rear end of magazine 14 as they are shifted from the intermediate portion of the groove 26 into alignment with said magazine.

The present machine is capable of accommodating slides of different thicknesses, that is, it is adapted to accommodate slides having relatively thick metal frames, as well as slides having paper frames, which usually are of considerably less thickness than the metal slides. For this reason, the groove 26 is of a width to accommodate the thickest slides, that is those having metal frames. In order to prevent the slides 16 from rattling or moving laterally as they are shifted in the groove 26, means are provided to contact and exert pressure on the front of the slides as they are shifted in the slide track. This means comprises a longitudinally extending bar 27 slidably supported on the shelf 25, and provided with pins 28 which are received within openings in posts 29. These posts are supported upon the shelf 25, and coil springs 30 are mounted on the pins 28 and interposed between the bar and their respective posts so as to exert inward spring pressure on the bar 27. Thus the bar 27 will not only constitute an additional guide means, but will tend to take up any clearance in the groove by pressing the slides against the inner wall of the groove 26 and thereby prevent any rattling or lateral movement of the slides as they pass through the slide track. This will be true, regardless of whether the slides are encased in metal, paper, or any other type of frame. It is to be understood, however, that the pins 28 may be adjusted relative to the posts to control the inward movement of the bar 27. In other words, the bar is not permitted to entirely close the groove and constitute an obstacle to the slides as they pass through the slide track. Any suitable stop means may be employed to control the inward movement of the bar, depending upon the thickness of the slides that are being used.

The frame 13 is provided with an upper cross bar or rail 31, within which is formed a longitudinally extending groove 32 positioned in alignment with the groove 26 and cooperating therewith to form the slide track. The rail 31 is rigidly connected to and supported by interior posts 33, 34, and end posts 35 and 36. These end posts are of substantially L-shape formation and have inwardly extending wings or flanges 37 and 38, respectively. The posts 33 and 34 likewise have inwardly extending wings 39 and 40, respectively. Each set of wings cooperates with a corresponding set on the front frame 12, to securely maintain its respective magazine detachably supported in the main frame 11 against lateral displacement. For instance, posts 41, 42, on the front frame 12 have rearwardly extending wings 43 and 44 in line with the wings 37 and 39 for maintaining magazine 15 in operative position.

In a similar manner, the front frame 12 is provided with posts 45 and 46 having rearwardly extending wings 47 and 48, respectively, cooperating with wings 38 and 40, to receive and position magazine 14 in the frame. It will be observed (see Figures 13 to 16) that each wing is either cut away or provided with a projection forming a shoulder 49, to limit the longitudinal movement of its respective magazine in the frame 11. With this construction, it will be apparent that each magazine with its set of slides 16 may be easily inserted and removed in the slide changing mechanism. The specific structure of the magazine or tray will be described in detail hereinafter.

In addition to employing the spring pressed guiding bar 27, the rear frame 13 is also provided with a pair of plates 50 and 51 adjustably mounted on the shelf 25 (see Figure 1). Plate 50 is in line with the magazine 15 and constitutes an abutment for engaging the slides as they are moved into position to be shifted in the slide track. The plate 50 constitutes a guard for preventing accidental removal of the slides as they reach the slide track. The plate 51 also constitutes a guide on the other side of the bar 27 to assist in guiding the slides as they are moved into position to be pushed into the magazine 14. Each of these plates is slotted so that by loosening the fastening means 52, the plate may be adjusted to take care of slides of varying thicknesses.

Figure 3:
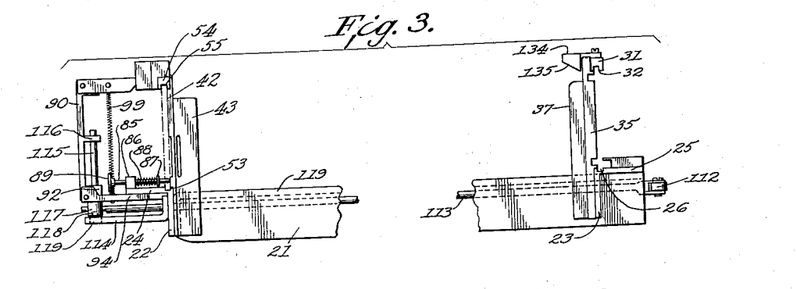
Figure 3 is a broken side view with the magazine removed.
Figure 4:
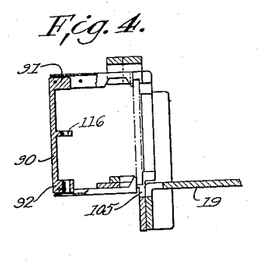
Figures 4 and 5 are detail views of the pusher mechanism.
Figure 6:
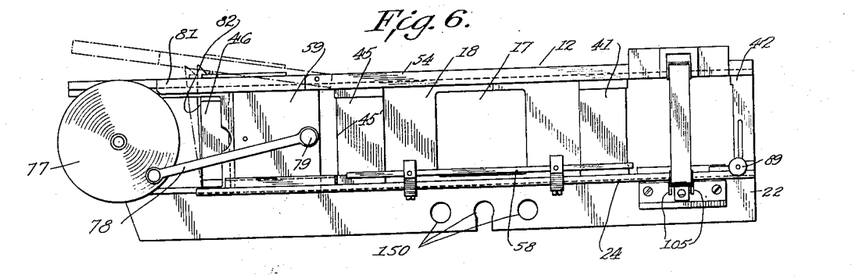
Figure 6 is an end view of the front of the machine showing the front slide track and slide carrier.

Referring now to Figures 1, 3, and 6, the front frame 12 and slide track are shown in detail. This frame is substantially similar to frame 13, in that the shelf 24 is provided with a longitudinally extending groove 53, forming the lower portion of the forward slide track. A top bar or rail 54 corresponds to the rail 31 of the rear frame 13, and is provided with a longitudinally extending groove 55 in alignment with the groove 53 and cooperating therewith to form the forward slide track. The primary difference between the frames 12 and 13 is that the forward frame 12 is provided with the centrally disposed plate 18 having the unobstructed window or opening 17 of a size to accommodate one of the slides 16. As will be observed from Figure 1, the projecting mechanism 56 is so located that its several lenses are in alignment with the window 17, whereby the image on each slide is projected onto a suitable screen (not shown) as the slides are shifted in the forward slide track from one magazine to the other.

The forward frame 12, similarly to the frame 13, is provided with a spring pressed bar 58 corresponding to the bar 27, and the inner wall of the groove 53 is cut away in front of the magazines to permit the slides to be received and discharged from the slide track. This is also true of the upper grooves 32 and 55.

Means for shifting the slides 16 in the front and rear slide tracks comprise a pair of slide carriers 59 (see Figures 1, 7, 8, and 9). Each slide carrier consists of a plate-like member of substantially rectangular formation having a relatively thick section 60 and a relatively narrow section 61. When it is desired to utilize relatively thick slides, such as those having metal frames as illustrated in the drawings, each slide carrier is mounted in its respective slide track, as shown in Figures 1 and 6. In this use of the slide carrier the inner edge 62 of the thicker portion 60 is adapted to engage a side edge of a front slide immediately after it is pushed from the front of the magazine into the slide track.

Figures 7, 9:
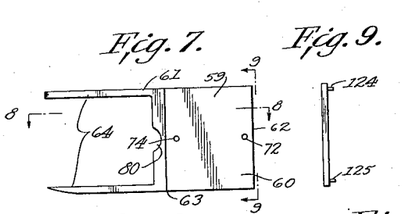
Figure 7 is a plan view of the slide carrier.
Figure 9 is an end view of the carrier.
Figures 8, 11, 12, 17:
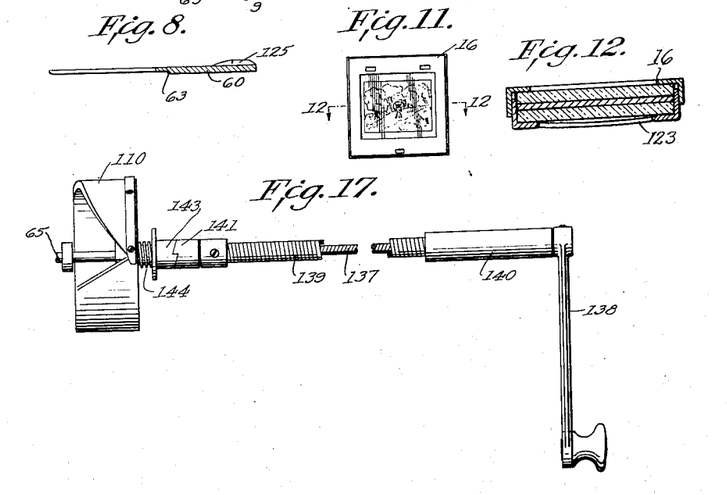
Figure 8 is a section on line 8—8 of Figure 7.
Figures 10 and 11 are front and rear views of a slide encased in a metal frame.
Figure 12 is a section on line 12—12 of Figure 11.
Figure 17 is a view showing a modified means for operating the slide changing mechanism.
Figure 10:
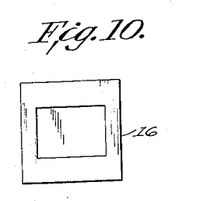

When it is desired to utilize slides which are relatively thin as compared with those having metal frames, such as, for instance, those having paper or cardboard frames, section 61 of the slide carrier is utilized. As shown in Figures 7 and 8, the line dividing the thick and thin sections forms a shoulder 63, which is adapted to engage the edge of the slide as it emerges from the front of the magazine. In other words, the section 61 forms a pocket within which the thin slide is adapted to fit.

In using the thin slides, each slide carrier must be removed from the apparatus and its position completely reversed, as distinguished from that shown in Figure 1. That is, the thin shouldered portion will face inwardly toward its respective magazine, so that the front slide in the magazine will be pushed into contact with the thin section 61, whereby the outer side edge of the thin slide will be engaged by the shoulder 63 and shifted into the slide track by the carrier. It will be observed that the thin section 61 is not solid, as is section 60, but has substantially all of its interior portion cut out to form a pair of legs 64. The slide carrier is constructed in this manner to accommodate the carrier operating means for the front carrier, as will be hereinafter described. Otherwise the thin section could consist of a solid plate, the same as the section 60.

Power for actuating the slide carriers is taken from a main power shaft 65, which extends outside and longitudinally of the frame 11. This shaft is journaled at one end in an upstanding arm 66 supported on the main frame (see Figure 1), and at the other end in a yoke 67 carried by a bracket 67' extending outwardly of and supported from the shelf 25. The shaft 65 is provided with a crank arm 68, to one end of which is pivotally secured a connecting rod 69. The other end of this rod is detachably connected to the rear slide carrier.

The means for detaching the connecting rod 69 to the carrier comprises a flattened head 70, within which is mounted a screw bolt 71. This bolt is freely rotatable in the head 70 but is locked thereon to prevent displacement and loss of the bolt. Each slide carrier is provided with a threaded opening 72 adjacent the outer edge of its thickened portion for receiving the threaded portion of the screw bolt. If it is desired to remove the slide carrier from the rear slide track, it is merely necessary to grasp the knurled head 73 of the screw bolt and unscrew the bolt from the slide cap. The carrier may then be slipped out of the frame 13, and if it is desired to reinsert it to accommodate thin slides, it should be reversed, as hereinbefore described, so that the thin section 61, including the legs 64, will engage the grooves 32 and 26. The screw bolt is then screwed into the threaded opening 74. This opening 74 is so arranged that it will readily align with and accommodate the bolt 71. In other words, when the slide carrier is reversed to accommodate the thin slides, the opening 74 will be in the same relative position as was the opening 72.

The shaft 68 is connected through a suitable reduction unit 75 to an electric motor 76. Operation of this motor will rotate the shaft 65, which, in turn, will rotate the crank arm 68, thereby oscillating the connecting rod 69 and reciprocating the slide carrier in the rear slide track. The throw of the connecting rod 69 is such as to advance each slide a predetermined distance. In the present construction, the arrangement is such that the slide will travel substantially its own length so that it will clear the space in front of the magazines and permit the next slide to be pushed into position in the slide track. In the position shown in Figure 1, the slide carrier has completed its inward travel and has started on its outward stroke and will be moved to the extreme left of the magazine 15 to permit the next slide to be shoved into operative carrier-engaging position.

Referring now to Figure 6, it will be observed that the means for reciprocating the slide carrier 59 in the front slide track comprises a rotary disk 77 fixed to one end of the main power shaft 65. A connecting rod 78 has one end thereof eccentrically and pivotally connected to the disk 77. The other end of the rod is provided with a screw bolt 79 corresponding to the screw bolt 71. This bolt is detachably connected to the front slide carrier, in the same manner as the screw bolt 71 is connected to the rear slide carrier.

It will be observed that with this construction, the disk 77 and the connecting rod 78 will effectively actuate the front slide carrier so that the window 17 is not obscured in any manner. However, since the operating means for the front carrier is on the same side of the frame as the carrier, as distinguished from the operating means for the rear carrier, it is thus necessary to prevent accidental clashing of the carrier with the disk and drive shaft during the reciprocation of the carrier. For this reason, it is necessary to have the greater portion of the thin section 61 of the carrier cut away, as illustrated, to provide the arms 64. As shown in Figure 6, this construction permits the arms 64 to straddle the shaft 65 without contacting the same. The extreme inner portion of the thin section is also provided with a recess 80 to further accommodate the shaft 65 and prevent any contact of the carrier with the shaft as the carrier reaches its extreme outer position.

Since the shaft 65 and disk 77 constitute an obstruction for preventing the front carrier from being slipped out of the slide track in a manner similar to the rear slide carrier, means are provided to permit the front carrier to be lifted out of the top of the track. This means comprises a gate 81 (see Figures 1 and 6) pivoted at its inner end on the top bar or rail 54, so that it may be swung upwardly, as shown in dotted lines. When the gate 81 is raised, the carrier 59 may be removed from the frame by loosening the screw bolt 79. The outer end of the gate 71 is supported upon the post 46, and a pivoted latch 82 is adapted to engage an inwardly extending arm 83 on the gate to maintain the latter in its lowered operative position. A coil spring 84 normally urges the latch 82 into locking position with the arm 83. It is to be understood that the gate 81 actually constitutes a continuation of the rail 54, and of the top groove 55 of the front slide track.

The end of each slide track, which is adjacent the rear end of each magazine, is provided with stop means for preventing the accidental removal of the slides during operation of the machine, and also to center the slides for movement into the rear ends of the magazines as they are shifted into such position by the slide carriers. This stop means, in each instance, comprises a pin 85 (see Figures 1 and 3) which is slidably mounted in a block 86 positioned on its respective shelf. For instance, the left-hand end of Figure 3 illustrates the front of the slide changing mechanism, and the block 86 is illustrated as being mounted on the shelf 24. The pin 85 is provided with an integral enlargement 87 adjacent its inner end, and a coil spring 88 is mounted on the pin between the block 86 and enlargement 87, and normally urges the inner end of the pin into engagement with the post 42. The pin, therefore, constitutes a stop for limiting the movement of and positioning a slide so that it may be subsequently pushed into the rear end of the supply magazine 15. If, for any reason, it is desired to remove this slide or any other slide in the slide track, it is merely necessary to grasp the head 89 of the pin and pull it outwardly against the tension of the spring 88, thereby clearing the slide track and permitting one or more of the slides to be removed. Upon release of the head 89, the spring 88 will return the pin to its normally operative position with its inner end abutting the post 42. As stated above, a similar pin 85 is mounted on the shelf 25 adjacent the rear end of the receiving magazine 14.

The means for pushing the slides into the rear end of each magazine as they are transferred thereto on the adjacent slide track, consists of sets of substantially similar pusher mechanisms. Referring to Figures 1 to 5, it will be observed that this mechanism comprises a supporting post 90 having laterally extending blocks 91 and 92 at its upper and lower ends, and upon which are pivotally mounted a pair of pusher arms 93 and 94, respectively. These arms are of substantially channel formation in cross section, the arm 93 having a pair of similar downwardly extending flanges 95, the rear ends of which are pivoted to the block 91. Since the top surface of the block 91 is flat, this will constitute a stop for engaging the base of the arm 93 and limit the downward movement of the arm. The same is true of the arm 94, this arm being provided with upwardly extending flanges 96, the rear ends of which embrace the rear end of the block 92 and are pivoted thereto.

Figure 5:
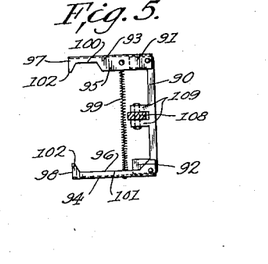

The free forward ends of the arms are provided with flat slide engaging surfaces 97, 98, respectively, which are adapted to contact the upper and lower portions of a slide after it is shifted into position in rear of a magazine, and push the slide forwardly into the magazine when the arms are operated. A coil spring 99 is positioned between and connects the arms 93 and 94, normally maintaining them in substantially horizontal position, as shown in Figure 5. Both sets of flanges 95 and 96 are cut away to provide reduced portions 100 and 101, respectively, adjacent the forward ends of the arms. This is to provide sufficient clearance to allow each slide to be shifted between the arms 93 and 94, as the slide is moved into alignment in rear of its respective magazine. The flange of each pusher arm is also formed with an inclined or beveled portion 102, extending from its reduced area to its flat slide engaging surface. This is to permit the arms to slide rearwardly over the upper and lower surfaces of a slide when the pusher mechanism is moved rearwardly to slide pushing position.

In order to guide the pusher mechanism in its forward and rearward paths and to prevent any lateral movement thereof, I provide upper and lower guide means for engaging and guiding the arms 93 and 94. Referring to Figure 2, it will be observed that a block 103 is mounted on the rail 31 directly above the entrance to the magazine 14. This block is provided with a centrally positioned passage 104 for receiving and guiding the upper pusher arm 93. The reduced portion 101 of the lower pusher arm 94 is located below the shelf 25 (see Figure 4), and this shelf is provided with a pair of transversely extending slots 105, within which the pusher engaging end portions 97 and 98 are slidably mounted. These slots are extended by cutting away portions of the longitudinal frame member 19 (see Figure 4) so that the lower arm may be moved forward sufficiently to push a slide into the rear end of the magazine 14.

The means for actuating the pusher mechanism for magazine 14 comprises a rocker arm 106, which extends outside of, and across, the rear slide track and is pivotally mounted on a rearwardly extending support 107 (see Figure 1). This arm is provided with an upper section 108, the intermediate portion of which is pivotally connected to a pair of ears 109 formed integral with the post 90 of the pusher mechanism. The outer free end of the section 108 extends beyond the end post 36 and into the path of a cam 110 mounted on the drive shaft 65. A guide member 111 (see Figure 2) is mounted on the shelf 25 and is provided with a slotted portion adapted to receive and prevent lateral movement of the section 108 as it is being rocked by the cam 110.

With the construction as thus far described, and assuming that the shaft 65 is rotating the cam 110, this action will actuate the rock shaft 196 and impart a rocking action to the section 108. Since the pusher mechanism is pivotally connected to the section 108, the arms 93 and 94 will be moved forwardly and rearwardly in their respective guides. The operation of the different elements are so synchronized that when the arms 93, 94, have completed their forward movement in which a slide has been pushed into the rear end of the magazine 14, the cut-away or reduced portions 100 and 101 of the arms will be in register with the slide track, whereby the slide carrier will operate to shift a slide between the pusher arms into alignment with the rear end of the magazine. Thereafter rearward movement of the section 108 will also effect a rearward movement of the pusher arms. Since these arms are capable of outward pivotal movement against the tension of the spring 99, and since the inclined or beveled portions 102 of the arms connect the reduced portions of the arms, these arms will separate sufficiently to move rearwardly over the upper and lower edges of the slide which has just been shifted between the arms. In other words, the pusher arms will travel rearwardly to a position in the rear of the slide, and as soon as they have cleared the slide, the spring 99 will contract the arms to their normal pusher position, whereby the flat slide engaging portions 97 and 98 will be directly in rear of the slide, and in position to push the slide forwardly into the magazine. This operation is repeated during the actuation of the machine as the slides are constantly shifted from the rear slide track into alignment with the magazine 14.

It is to be understood that a similar pusher mechanism is mounted at the rear of the magazine 15 for pushing the slides into this magazine as they are received from the front slide track after being exhibited. The pusher arm and guide means are identical with those above described, the only difference being in the connections for reciprocating the pusher mechanism back and forth in the guides. In this connection the rocker arm 106 functions as the means for actuating the front pusher mechanism, as well as the rear pusher mechanism. The rocker arm is provided with a section 112 on the other side of the pivot from the section 108. The end of section 112 is pivotally connected to one end of a longitudinally extending rod 113, which is mounted longitudinally of and below its respective frame member 19 (see Figures 1 and 3).

The other end of this arm extends through suitable openings in the frame members 19 and 22, and also through an opening in a supporting platform 114 mounted on the frame 22 (see particularly Figure 3). The post 90 of the forward pusher mechanism is removably supported upon a member 115, which passes through an opening in the lower block 92 of the post, and also through a hole in an inwardly extending lug 116 of the post. The lower end of the member 115 is provided with a head 117, upon which the lower pusher arm 94 rests. This head has formed therein a transverse opening through which the extreme reduced end portion of the rod 113 projects. A set screw 118 is threaded into the lower end of the head 117 to clamp the end of the rod 113 thereto. An opening 119 is formed in the supporting platform 114 to permit loosening of the set screw 118 when it is desired to remove the pusher mechanism from the rod 113.

The construction and operation of the rocker arm 106 is such that as the cam rocks the sections 108 and 112 about the central pivot of the arm, this motion will be transmitted to both of the pusher mechanisms whereby they will be actuated to simultaneously push slides into the rear ends of the magazines 14 and 15. As described hereinabove, the pusher mechanism and the slide carrier mechanism are so synchronized that, as the slide carriers are operated to shift the slides in the front and rear slide tracks, the pusher arms will be held momentarily stationary in their forward positions to receive slides between their respective arms. As the movement of each slide carrier is reversed, each pusher mechanism will be shifted rearwardly so that its arms will clear the slide and come to rest directly in rear of the slide, and thereby be in position to push the slide forwardly into its respective magazine when the arms are again moved forwardly. As the arms move forwardly, the slide carriers will operate to move slides in the tracks and again shift the end slides between the arms of the pusher mechanism. This synchronized operation will continue to shift the slides in the slide carriers and magazines so that an entire series of slides may be readily exhibited as desired. In order that the rocker arm 106 will always be maintained in operative engagement with the cam 110, I provide a coil spring 120. One end of this spring is connected to an intermediate portion of the section 108, while the other end is connected to a stationary post 121 rigidly connected to the motor base 122. It will be observed that the cam is formed with a gradually inclined surface and an abrupt drop (see Figure 1). This is for the purpose of moving the pusher arms forward at a uniform speed and then quickly returning the arms to their slide pushing position. It is to be understood that the relative movement of the pusher arm may be varied as desired by changing the cam track.

It will be observed that each set of pusher arms 93 and 94, together with their supporting post 90, are directly connected to their respective operating mechanism and that no spring means are employed for constantly urging the pusher arms into engagement with the rearmost slides in the magazines or for exerting spring pressure upon the slides. With the present construction, this is unnecessary, since the pusher mechanism is designed to utilize and take advantage of the resiliency and springiness of the slides themselves to effect an efficient operation of the apparatus.

I have ascertained that, with a magazine full of slides having metal frames as illustrated in the drawings, the springiness of the frames is such that they will be compressed and expanded during each forward and rearward movement of the pusher mechanism. That is, each frame is capable of a certain amount of transverse compression and expansion when acted upon by the pusher arms. Therefore, the total compression and expansion of all of the slide frames in a magazine is considerable and eliminates the necessity of providing the pusher mechanism with spring means, since the spring-like action is adequately transmitted from the rearmost to the front slide in the magazine.

Because of this flexibility of the slides, it is not necessary that any specified number by placed in each magazine in order to insure an efficient operation of the apparatus. That is, one or more slides may be inserted or removed from a magazine as desired, the only requisite being that there be a sufficient number of slides in a magazine to permit the pusher mechanism to transmit the pushing action to the slides at the front of the magazine.

I have also found that this same springiness and resiliency is inherent in slides having paper or cardboard frames, and that such slides operate equally as well in my apparatus, as those having metal frames. This springiness in the paper frames is undoubtedly due to the fact that air penetrates between adjacent slides and forms air pockets. Furthermore, the porosity of the paper permits penetration of the air into the paper or cardboard itself and assists in the springy and resilient action of the slides when acted upon by the pusher mechanism. It is to be understood that slide frames made of other materials having these characteristics may be used with equal success in the present apparatus.

The slide changing mechanism as thus far described provides a very effective machine. I have found, however, that when slides with metal frames are used, these slides are apt to become jammed in the machine, particularly when one slide is being shifted laterally out of the front of a magazine relative to its adjacent slide. This is caused primarily because of the fact that many of the metal frames have warped or bellied edges which project outwardly from the normal plane of the casing or frame. Such a warped frame is shown at 123 in Figure 12 of the drawings. If a slide having a warped frame of this character is positioned in one of the magazines so that the warped portion extends vertically of the frame, it is possible that the frame of its adjacent slide will engage the warped portion as it is being shifted laterally into one of the slide tracks. When this occurs, it will be apparent that the slide which is being shifted laterally will become locked against the warped slide and thereby produce a jamming action of the entire machine, since the slide carrier will be unable to shift the front slide wholly into the slide track. This jamming action may also be caused by raised portions or other projections on the frame of either the slide which is being shifted, or its adjacent slide.

I have incorporated into the present machine means for eliminating this objectionable feature and for preventing locking or jamming of the slides as they are shifted laterally out of the front of one magazine into its adjacent slide track. This is accomplished by effecting a positive agitating or rocking action of the slides, not only when they reach the front of the magazine, but as they gradually approach the front end of the magazine.

Referring to Figures 13 to 16, there is disclosed in detail a mechanism for accomplishing this agitating or rocking action. While different mechanisms may be employed to separate and rock the slides, I have found that this may be very effectively accomplished by providing a cam mechanism on the inner face of the thick portion of each slide carrier. This cam mechanism comprises a pair of cams 124 and 125 (see Figure 9). Cam 124 is rigidly secured to the upper inner surface of the thick portion 60 of the slide carrier, while cam 125 is mounted in alignment with cam 124 adjacent the lower inner surface of the carrier. Each cam is provided with a relatively flat slide engaging surface, this surface being highest intermediate its ends and sloping downwardly at each end to the inner face of the carrier.

Figure 13:
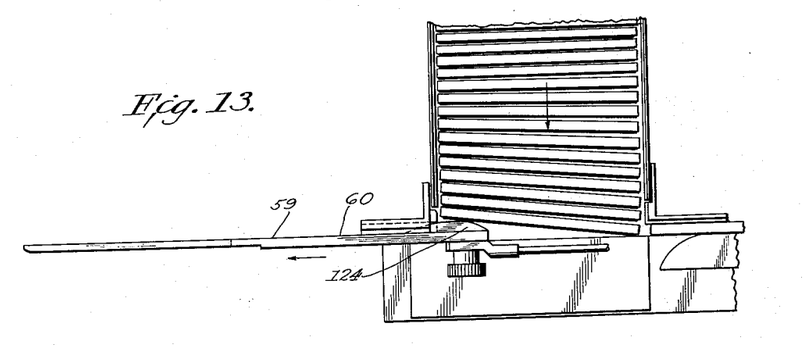
Figures 13, 14, 15 and 16 are enlarged fragmentary views showing the rocking movement transmitted to a slide as it is being transferred from the front of a magazine to a slide track.

I have found that a cam mechanism formed in this manner will transmit a series of rocking actions or motions to the slides as the slide carrier is reciprocated back and forth. These rocking actions will cause a separation of both edges of the front slide from its adjacent slide just prior to the shifting of the slide by the carrier into its respective slide track. Figure 13 is a view showing the slide carrier 59 just before it clears the outer side of the magazine. This movement not only effects a final rocking action on the front slide, but in varying degrees on a number of the slides in rear of the front slide. It will be observed that this rocking action positively separates the inner edges of the slides.

Figure 14:
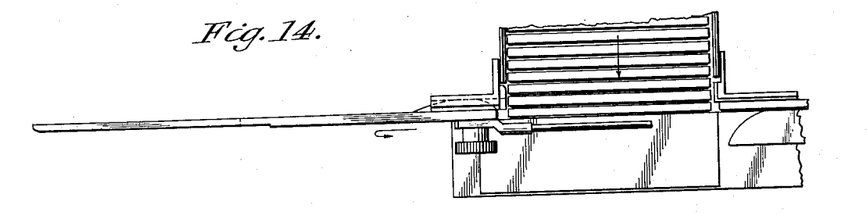
Figure 15:
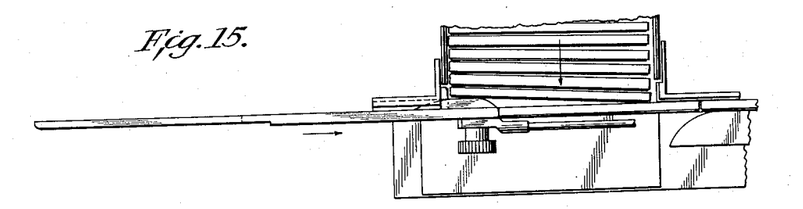

Figure 14 discloses the slide carrier in its extreme outward position just prior to its return movement for shifting the front slide in the slide track. Figure 15 shows the action of the cams as the slide carrier starts its initial shifting movement. This action, similarly to that shown in Figure 13, positively separates the inner edges of a number of slides in back of the front slide. It, furthermore, raises the outer edge of the adjacent slide from that of the slide which is being shifted by the slide carrier, so that any warped portions or projections on either one or the other of these slides will be positively separated to prevent any jamming or locking of one slide relative to the other which might prevent the front slide from being entirely shifted away from the magazine out of the path of the next slide.

Figure 16:
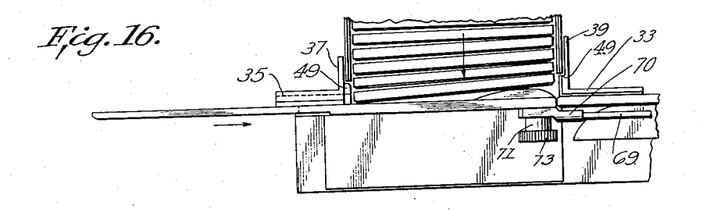
Figure 18:
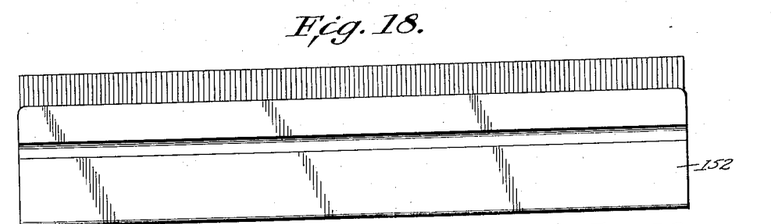
Figure 18 is a side elevation of one of the magazines or trays.
Figure 19:
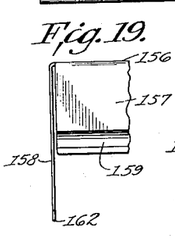
Figure 19 is a fragmentary view of an end of the cover for the magazine.
Figures 20, 21, 22:
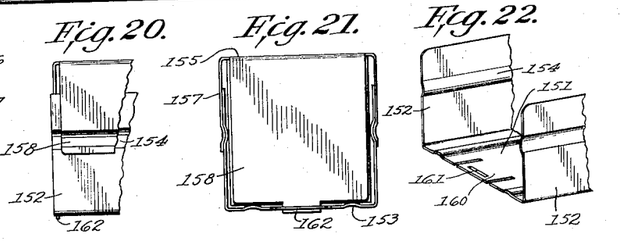
Figure 20 is a fragmentary view showing the cover applied to the magazine.
Figure 21 is an end view showing the cover applied to the magazine.
Figure 22 is a fragmentary view of an end of the magazine.

Figure 16 shows the slide carrier at the end of its inward movement. In this position, it will be observed that the outer end of the slide which is being shifted is positively separated from its adjacent slide so as to insure against any jamming or locking action between the slides. In view of the fact that this rocking action not only affects the extreme front slide, but also a number of slides which are being advanced toward the front of the magazine, it will be apparent that the cam mechanism is very effective, since the slides are being constantly separated one from another as they gradually advance into the front of the magazine.

It is, of course, to be understood that the rocking action is synchronized with the action of the pusher mechanism in the rear of each magazine. In other words, the pushing action of the pusher mechanism at one end of the magazine, is resiliently transmitted to the front of the magazine and cooperates with the rocking action of the cams to effect the separation of the slides as they approach the front of the magazine. This rocking action is somewhat dependent upon the resiliency and springiness of the slide frames. At least, this resiliency of the frames greatly facilitates the rocking action, which, in turn, produces the separation of the slides as they approach the front of the magazine.

In addition to the cam mechanism for effecting the rocking action on the slides, I provide a further means for assuring that the slides will not jam or catch in the mechanism as they are being transferred from the front of a magazine to its adjacent slide track. Referring to Figure 2, it will be observed that the post 33 located interiorly of the front of magazine 15, has its front face 33' reduced in thickness intermediate its ends to provide upper and lower shoulders 33². In other words, all of the surface of the front face 33' between its upper and lower edges is of less thickness than the upper and lower surfaces. With this construction, and assuming that the rear face of the frame of the front slide is warped or bellied as illustrated in Figure 12, the reduced intermediate portion of the post 33 will provide sufficient clearance to permit the slide to pass freely over this post. It will be apparent, however, that if the post was not provided with this cut-away or reduced portion, the edge of the warped portion of the frame would be likely to catch on the corner of the post and jam the slide against further lateral movement into the slide track. This objectionable feature is, of course, obviated by the present construction. The post 45 in the front frame 12 (see Figure 6) is likewise provided with a reduced intermediate portion 45' to take care of warped or defective frames.

Any suitable switch mechanism may be utilized to control the operation of the slide changing mechanism, the main requisite being that the operator will have a flexible control of the apparatus. That is, that the slides may be exhibited throughout either a short or long interval, as desired. The switch mechanism of the present construction is designed to accomplish this result, and comprises a main switch 126 mounted in the motor support or base 122 (see Figures 1 and 26). This base also accommodates an outlet plug 127 for plugging in the projector. The main circuit of the apparatus is designated by the wiring 128, and this is connected to the motor 76 and to a cam-actuated switch arm 129 of the switch 129'. The switch arm 129 is normally spring pressed outwardly against the cam 110. This cam carries an arcuate strap 130, which, upon rotation of the cam, engages the arm 129, and moves it sufficiently to break the circuit to the motor. The strap is so positioned that the circuit is broken just as a slide is presented to the window 17. Therefore, assuming that the circuit is closed, and that the arm 129 is not in contact with the strap 130, the cam will be rotated and the slide changing mechanism actuated to shift one slide away from the projector and a new slide into the window in position to be exhibited. As the new slide is shifted into the window 17, the strap 130 will engage the arm 129, moving it sufficiently to open the switch 129', thereby stopping the slide changing mechanism whereby the new slide may be exhibited as long as desired.

The means for closing the circuit to the motor to again operate the slide changing mechanism comprises a second switch element 131, which is in a circuit 132 that bridges the switch 129' (see Figure 26). Therefore, when the button 133 is depressed, it closes the main circuit and thereby energizes the motor to operate the mechanism. As soon as the cam has been rotated sufficiently to move the strap 130 off of the arm 129, the button 133 may be released, since the circuit will be closed until the strap again rotates around to a position to contact and move the arm 129. Assuming that the button 133 has been released, the circuit will again be broken so that the new slide may be exhibited as long as desired. It is to be understood, however, that if the operator wishes to shift several slides quickly past the window 17, it is merely necessary to maintain the button 133 depressed. This will keep the main circuit closed, regardless of the position of the strap 130 and switch arm 129, so that subsequent slides may be quickly shifted past the window. This shifting action will continue until the switch button 133 is released. It will be apparent, therefore, that the present electrical connections provide a flexible unit which will permit the operator to exhibit the slides for either a short or long period, as desired.

In the event that certain of the slides have been accidentally raised or lifted out of their normal positions in the magazines, I have provided means for forcing such slides downwardly into their correct positions prior to their movement from the front of a magazine into the slide track. This is accomplished by mounting on each of the top rails or bars 31 and 54, a block 134 (see Figures 1 and 3). Each block is provided with a downwardly and forwardly inclined or beveled face 135, which is positioned directly above the front extremity of its respective magazine. With this construction, and assuming that a slide is raised above the other slides as it approaches the front of the magazine, the top edge of the slide will engage the inclined surface 135 and be gradually lowered to its normal position where it will correctly pass through the front of the magazine into the slide track. The block 134 is mounted on the free end of an arm 136, this arm being pivoted to its respective top rail so that it may be moved about its pivot from the position over the magazine to permit the latter to be removed from the frame 11.

While it is preferred that the mechanism be motor operated, this is not essential, since a manually actuated means may be employed, if desired. In this connection, I have illustrated a modified structure in Figure 17, for manually rotating the drive shaft 65 and cam 110. The end of the shaft is connected to a flexible cable or wire 137 which, in turn, is connected to an operating handle 138. The cable 137 is encased in a flexible casing 139, the outer end of which is surrounded by a rigid sleeve 140.

Rotation of the handle 138 will transmit rotary motion to shaft 65 and thereby actuate the apparatus. As a safety measure, a clutch is provided between the cam 110 and motor 76 to prevent damage to the shaft in the event any of the operating parts should become jammed. This clutch comprises a clutch element 141 fixed to the shaft section 142, the section being separated from the shaft 65 at a point within the clutch.

A second clutch element 143 is splined or keyed to the shaft 65 and has a cam surface normally held in engagement with a complementary cam surface on element 141 by a spring 144 positioned between the element 143 and the yoke 67. During normal operation of the apparatus, the clutch will operatively connect shaft section 142 to shaft 65. However, if shaft 65 or any element associated therewith is jammed, the cam surface on clutch element 141 will rotate relative to that of cam element 143 and thereby prevent damage to the mechanism. This clutch mechanism is also applied to the hand operated structure shown in Figure 17.

The motor base 122 is rigidly secured to the main frame 11 by reason of the connection of its top plate 145 to one flange of an angle iron 146 (see Figures 1 and 2). The other flange is secured to the depending flange of the frame member 19 which supports magazine 14. A leg 147 also connects the base 122 to the lower frame element 22, while a leg 148 depends from the frame member 19 on the other side of the apparatus. The base 122 and leg 148 constitute means for supporting the main frame in slightly raised position. The front of the projector cooperates to support the front of the frame. It will be observed that plates 149 are secured to the rear ends of the frame members 19 and project inwardly of the magazines to form shelves upon which the rear of the projector is adjustably supported. Openings 150 in the lower cross frame 22 are provided to accommodate means for connecting the projector to the front of the frame.

Referring now to Figures 18 to 22, there is disclosed in detail one of the trays or magazines. This tray is of substantially channel formation in cross section and comprises a base 151 and side walls 152. The base is provided with a pair of spaced longitudinally extending inwardly pressed portions forming ridges 153. Each side 152 is likewise provided with an inwardly pressed portion forming a longitudinally extending ridge 154 which cooperates with the ridges 153 to facilitate the passage of the slides through the magazines. It will be apparent that the slides contact only these ridges as they pass through the magazines, and the travel of the slides is, therefore, greatly assisted, since the frictional resistance is considerably reduced, there being only the four contact surfaces which the slides engage as they pass through the magazines.

In view of the fact that each tray is open ended, I have provided a cover 155 for the tray, to be used when it is desired to remove a magazine from the apparatus. This cover comprises a top 156, side walls 157, and end walls 158. Each side 157 is provided with a longitudinal inwardly projecting ridge 159 adjacent its lower end, which, when the cover is applied to the tray, is adapted to spring into the outside channel formed by a ridge 154, and thereby detachably lock the cover to the tray. When it is desired to remove a magazine from the apparatus, the slides are pressed into the magazine at each end, and the cover is slipped over the top of the tray and pressed down to the position shown in Figures 20 and 21, so that the ridges 159 of the cover snap into the channel portions 154 of the tray, and thereby lock and securely maintain the slides in the tray as it is removed from the main frame 11.

In order to prevent any of the slides from accidentally slipping out between the ends 158 of the cover and the ends of the tray, I further provide means for locking these ends against distension or expansion. In this connection, each end of the base 151 of the tray is cut out to provide a tongue 160 having formed therein a transverse slot 161. Each end 158 is also provided with an extension 162 adapted to align with its respective slot 161 as the cover is applied to the tray. As the channels and ridges in the cover and tray are moved into locking engagement, the extensions 162 simultaneously move into the slots 161 and thereby lock the ends 158 from outward movement. This prevents any accidental removal of the slides from the ends of the tray.

Figure 23:
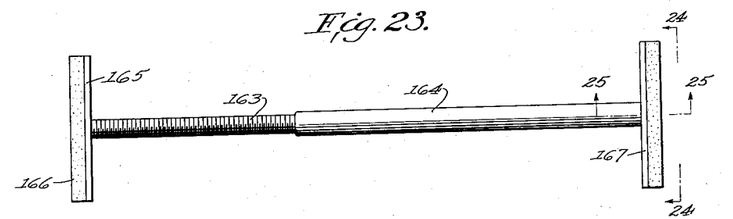
Figure 23 is a side elevation of a spacer.
Figure 24:
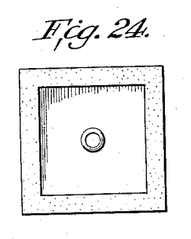
Figure 24 is an end view thereof.
Figure 25:
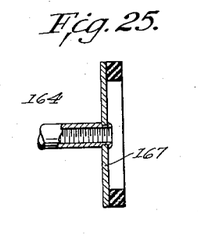
Figure 25 is a section on line 25—25 of Figure 23.

In Figures 23 to 25, I have illustrated a spacer which may be utilized in event that the operator is not supplied with sufficient slides to completely fill both magazines. In this event, or if the series which the operator is exhibiting, comprise only a few slides, a pair of these spacers may be effectively utilized. Each spacer consists of a threaded rod 163 which is telescoped within an internally threaded sleeve 164. The free end of the rod 163 has rigidly connected thereto a head 165 whose outer face is provided with a border of resilient material 166, such as rubber. A similar head 167 is secured to the free end of the sleeve or tube 164, but in this instance, the head is rotatably mounted on the end of the sleeve (see Figure 25) instead of being rigidly secured thereto.

Assuming that it is desired to utilize a pair of spacers, each one is inserted into its respective magazine. In view of the fact that the head 167 is rotatably mounted on the sleeve, it is merely necessary to rotate the sleeve to either expand or contract the spacer to correctly fill the space in the magazine. In other words, because of this particular construction, it is not necessary to constantly remove the spacer and rotate the sleeve relative to the rod, in order to provide the correct fit between the spacer and the slides in the magazine. Due to the adjustability of the spacer, it is capable of being telescoped to occupy the space of only a few slides, or it can be expanded so as to occupy as much of the area of a magazine as is necessary. Assuming that a spacer is inserted in magazine 15, the slides to be exhibited will be placed between the front of the magazine and one of the heads of the spacer. The sleeve or tube 164 is then rotated to take up any clearance, the rubber border 166 forming a resilient cushion between the spacer and slides. It will, of course, be necessary for the operator to watch the travel of the slides so as to shut off the machine when the front of the spacer reaches the extreme front of the magazine. Otherwise, there would be a jamming action which would prevent the operation of the slide changing mechanism. Of course, the ideal arrangement is to have the magazines completely filled with slides such as disclosed in Figure 1 of the drawings, and the spacers are used only where the series to be exhibited is very small or the operator is not provided with sufficient slides to completely fill the magazines.

It is to be understood that the term "slide track" in the claims is to be broadly interpreted to include any means for supporting and guiding a slide after it leaves the magazine. It is to be further understood that the invention is not limited to details of construction shown in the drawings and described in the specification, and that the phraseology employed in the specification is for the purpose of description and not of limitation.

I claim:

1. In a device of the character described, a magazine for holding a plurality of picture slides, a slide track mounted transversely of and connecting one end of the magazine, a slide carrier movable back and forth in advance of the magazine and adapted to engage an edge of the end slide in the magazine and transfer it to the slide track, and a pair of spaced cams mounted on the inner face of said slide carrier and adapted to transmit a rocking movement to the second slide in the magazine as the slide carrier is shifting the front slide to the slide track, whereby the front slide is permitted to move freely out of the magazine away from the second slide.

2. In a device of the character described, a magazine for holding a plurality of picture slides, a slide track mounted transversely of and connecting one end of the magazine, a slide carrier comprising a plate-like member movable back and forth in advance of the magazine and adapted to engage an edge of the end slide in the magazine and transfer it to the slide track, and a pair of cams mounted on the inner face of the carrier, one cam being located adjacent the upper inner edge and the other cam located adjacent the lower inner edge of the plate-like member, said cams being adapted to transmit a rocking movement to the second slide in the magazine as the slide carrier is shifting the front slide to the slide track, whereby the front slide is permitted to move freely out of the magazine away from the second slide.

3. In a device of the character described, a magazine for holding a plurality of picture slides, a slide track mounted transversely of and connecting one end of the magazine, a slide carrier comprising a plate-like member movable back and forth in advance of the magazine and adapted to engage an edge of the end slide in the magazine and transfer it to the slide track, and a cam mounted on the inner face of said plate-like member adjacent the inner edge thereof, said cam having a relatively flat slide engaging surface, said surface being highest intermediate its ends and sloping downwardly at each end to the face of the plate, said cam being adapted to transmit a rocking movement to the second slide in the magazine as the slide carrier is shifting the front slide to the slide track, whereby the front slide is permitted to move freely out of the magazine away from the second slide.

4. A reversible slide carrier for use with a slide changing apparatus and adapted to transfer slides from a magazine to a slide track positioned transversely of and connected to the magazine, said carrier comprising a plate-like member having a relatively straight edge adapted to engage the edge of a slide and shift it from the magazine to the slide track, said member when reversed having a section of less thickness than the rest of the plate for accommodating and shifting relatively thin slides.

5. A reversible slide carrier for use with a slide changing apparatus and adapted to transfer slides from a magazine to a slide track positioned transversely of and connected to the magazine, said carrier comprising a plate-like member having a relatively straight edge adapted to engage the edge of a slide and shift it from the magazine to the slide track, said member having a section of less thickness than the rest of the plate, the line dividing the two sections forming a shoulder extending transversely of the plate and adapted when the member is reversed to engage an edge of a relatively thin slide and shift it to the slide track.

6. A slide carrier for use with a slide changing apparatus and adapted to transfer slides from a magazine to a slide track positioned transversely of and connected to the magazine, and cam means carried by said carrier for engaging an adjacent slide and transmitting a rocking action thereto relative to the front slide in the magazine to permit said front slide to move freely out of the magazine away from its adjacent slide.

7. A slide carrier for use with a slide changing apparatus and adapted to transfer slides from a magazine to a slide track positioned transversely of and connected to the magazine, said carrier comprising a plate-like member having a relatively straight edge adapted to engage the edge of the front slide and shift it from the magazine to the slide track, the side of the plate facing the magazine being provided with cam means for engaging an adjacent slide in the magazine and transmitting thereto a rocking action relative to the front slide in the magazine to permit said front slide to move freely out of the magazine away from its adjacent slide.

8. A slide carrier for use with a slide changing apparatus and adapted to transfer slides from a magazine to a slide track positioned transversely of and connected to the magazine, said carrier comprising a plate-like member having a relatively straight edge adapted to engage the edge of a slide and shift it from the magazine to the slide track, and spaced cams mounted on the side of the plate facing the magazine, one cam being located adjacent the upper inner edge and the other cam located adjacent the lower inner edge of the plate, said cams being adapted to engage a slide in the magazine and transmit thereto a rocking action relative to the front slide in the magazine to permit said front slide to move freely out of the magazine away from its adjacent slide.

9. In a device of the character described, a supporting frame, a pair of spaced magazines mounted on the frame, a pair of slide tracks, each connecting adjacent ends of the magazines and forming therewith a closed circuit for allowing the slides to be moved from one magazine to another, means for shifting the slides on the slide tracks from the front end of one magazine to the rear end of the other magazine, and means associated with the rear end of each magazine for pushing the slides forwardly in the magazines as the foremost slide is being moved out of the front end thereof, said means including a pair of upper and lower pusher arms adapted to engage the rearmost slide and move it and the other slides forwardly in the magazine, cooperating means on said arms for permitting a slide from the adjacent slide track to be shifted between said arms in rear of the front ends thereof when said arms are in engagement with the rearmost slide, and means for permitting separation of said arms whereby they may be moved rearwardly of the shifted slide and in position to push said slide forwardly into the magazine.

10. In a device of the character described, a supporting frame, a pair of spaced magazines mounted on the frame, a pair of slide tracks, each connecting adjacent ends of the magazines and forming therewith a closed circuit for allowing the slides to be moved from one magazine to another, means for shifting the slides on the slide tracks from the front end of one magazine to the rear end of the other magazine, and means associated with the rear end of each magazine for pushing the slides forwardly in the magazine as the foremost slide is being moved out of the front end thereof, said means including a pair of upper and lower pusher arms adapted to engage the rearmost slide and move it and the other slides forwardly in the magazine, the forward free ends of said arms having flat slide engaging surfaces, said arms having reduced portions in rear of said slide engaging surfaces to allow a slide from the adjacent slide track to be shifted between said arms when they are in engagement with the rearmost slide, and means for permitting separation of said arms whereby they may be moved rearwardly of the shifted slide and in position to push said slide forwardly in the magazine.

11. In a device of the character described, a supporting frame, a pair of spaced magazines mounted on the frame, a pair of slide tracks, each connecting adjacent ends of the magazines and forming therewith a closed circuit for allowing the slides to be moved from one magazine to another, means for shifting the slides on the slide tracks from the front end of one magazine to the rear end of the other magazine, and means associated with the rear end of each magazine for pushing the slides forwardly in the magazine as the foremost slide is being moved out of the front end thereof, said means including a pair of pivotally mounted upper and lower pusher arms adapted to engage the rearmost slide and move it and the other slides forwardly in the magazine, the forward free ends of said arms having flat slide engaging surfaces, said arms having reduced portions in rear of said slide engaging surfaces to allow a slide from the adjacent slide track to be shifted between said arms when they are in engagement with the rearmost slide, each arm having an outwardly inclined portion connecting the flat slide engaging surface with the reduced portion to permit it to slide rearwardly over the shifted slide and in position to push said slide forwardly in the magazine.

12. In a device of the character described, a supporting frame, a pair of spaced magazines mounted on the frame, a pair of slide tracks, each connecting adjacent ends of the magazines and forming therewith a closed circuit for allowing the slides to be moved from one magazine to another, means for shifting the slides on the slide tracks from the front end of one magazine to the rear end of the other magazine, and means associated with the rear end of each magazine for pushing the slides forwardly in the magazine as the foremost slide is being moved out of the front end thereof, said means including a post carried by the frame and movable to and from the rear of the magazine, a pair of pusher arms pivotally mounted upon opposite ends of said post and having their free ends extending forwardly and formed to provide flat slide engaging surfaces adapted to contact the rearmost slide and move it and the other slides forwardly in the magazine, said post limiting the inward movement of the arms, and spring means connecting said arms and normally urging them inwardly toward each other, said arms having reduced portions in rear of said slide engaging surfaces to allow a slide from the adjacent slide track to be shifted between said arms when they are in engagement with the rearmost slide, each arm having an outwardly inclined portion connecting the flat slide engaging surface with the reduced portion to permit it to slide rearwardly over the shifted slide and in position to push said slide forwardly in the magazine.

13. In a device of the character described, a supporting frame, a pair of spaced magazines mounted on the frame, a pair of slide tracks, each connecting adjacent ends of the magazines and forming therewith a closed circuit for allowing the slides to be moved from one magazine to another, means for shifting the slides on the slide tracks from the front end of one magazine to the rear end of the other magazine, means associated with the rear end of each magazine for pushing the slides forwardly in the magazine as the foremost slide is being moved out of the front end thereof, said means including a pair of upper and lower pusher arms adapted to engage the rearmost slide and move it and the other slides forwardly in the magazine, said arms being constructed to allow a slide from the adjacent slide track to be shifted between said arms in rear of the front ends thereof when said arms are in engagement with the rearmost slide, said arms being separable to permit them to be moved rearwardly of the shifted slide and in position to push said slide forwardly into the magazine, and means for guiding said pusher arms in their forward and rearward movements comprising a block mounted on the frame above the upper arm and having a guide passage for receiving and guiding said upper arm, said frame having a slot formed therein and extending partially into the rear end of the magazine for receiving and guiding the lower arm.

14. In a device of the character described, a supporting frame, a pair of spaced magazines mounted on the frame, a pair of slide tracks, each connecting adjacent ends of the magazines and forming therewith a closed circuit for allowing the slides to be moved from one magazine to another, means for shifting the slides on the slide tracks from the front end of one magazine to the rear end of the other magazine, means associated with the rear end of each magazine for pushing the slides forwardly in the magazine as the foremost slide is being moved out of the front end thereof, said means including a pair of pivotally mounted upper and lower pusher arms adapted to engage the rearmost slide and move it and the other slides forwardly in the magazine, the forward free ends of said arms having flat slide engaging surfaces, said arms having reduced portions in rear of said slide engaging surfaces to allow a slide from the adjacent slide track to be shifted betwen said arms when they are in engagement with the rearmost slide, each arm having an outwardly inclined portion connecting the flat slide engaging surface with the reduced portion to permit it to slide rearwardly over the shifted slide and in position to push said slide forwardly in the magazine, and means for guiding said pusher arms in their forward and rearward movements comprising a block mounted on the frame above the upper arm and having a guide passage for receiving and guiding said upper arm, said frame having a slot formed therein extending longitudinally of and partially into the rear end of the magazine, said lower arm being mounted below the slotted portion of the frame, with its forward slide engaging portion projecting into the slot and movable therein as the upper arm is moved in said block.

15. In a device of the character described, a supporting frame, a pair of spaced magazines mounted on the frame, a pair of slide tracks, each connecting adjacent ends of the magazines and forming therewith a closed circuit for allowing the slides to be moved from one magazine to another, means for shifting the slides on the slide tracks from the front end of one magazine to the rear end of the other magazine, means associated with the rear end of each magazine for pushing the slides forwardly in the magazine as the foremost slide is being moved out of the front end thereof, said means including pusher members adapted to engage the rearmost slide and move it and the other slides forwardly in the magazine, means for actuating said pusher members, comprising a rocker arm pivotally mounted intermediate its ends at one end of the frame, one of said pusher members being pivotally mounted on said rocker arm at a point in the rear of and in line with one of the magazines, a rod mounted in the frame and extending longitudinally of the other magazine and having one end thereof connected to the rocker arm, the other end of said rod being connected to the other pusher member, and means for actuating said rocker arm to alternately move each pusher member into engagement with the rearmost slide in its respective magazine.

16. In a device of the character described, a supporting frame, a pair of spaced magazines mounted on the frame, a pair of slide tracks, each connecting adjacent ends of the magazines and forming therewith a closed circuit for allowing the slides to be moved from one magazine to another, means for shifting the slides on the slide tracks from the front end of one magazine to the rear end of the other magazine, means associated with the rear end of each magazine for pushing the slides forwardly in the magazine as the foremost slide is being moved out of the front end thereof, said means including pusher members adapted to engage the rearmost slide and move it and the other slides forwardly in the magazine, means for actuating said pusher members comprising a rocker arm pivotally mounted intermediate its ends at one end of the frame, one of said pusher members being pivotally mounted on said rocker arm at a point in the rear of and in line with one of the magazines, a rod slidably mounted in the frame below and extending longitudinally of the other magazine and having one end thereof connected to the rocker arm on the other side of its pivot from the first pusher member, and a second pusher member mounted at the rear of the other magazine and operatively connected to the other end of said rod whereby operation of the rocker arm will alternately move each pusher member into engagement with the rearmost slide in its respective magazine.

17. In a device of the character described, a supporting frame, a pair of spaced magazines mounted on the frame, a pair of slide tracks, each connecting adjacent ends of the magazines and forming therewith a closed circuit for allowing the slides to be moved from one magazine to another, slide carriers positioned in said tracks for shifting the slides from the front end of one magazine to the rear end of the other magazine, means associated with the rear end of each magazine for pushing the slides forwardly in the magazine as the foremost slide is being moved out of the front end thereof, said means including pusher members adapted to engage the rearmost slide and move it and the other slides forwardly in the magazine, means for actuating said pusher members comprising a rocker arm pivotally mounted intermediate its ends at one end of the frame, one of said pusher members being pivotally mounted on said rocker arm at a point in the rear of and in line with one of the magazines, a rod mounted in the frame and extending longitudinally of the other magazine and having one end thereof connected to the rocker arm, the other end of said rod being connected to the other pusher member, a drive shaft mounted in and longitudinally of the frame at one side thereof, connecting rods operatively connecting the slide carriers to the drive shaft, and a cam mechanism mounted on the shaft and operatively connected to the rocker arm to rock said arm about its pivot and alternately move each pusher member into engagement with the rearmost slide in its respective magazine.

18. In a device of the character described, a frame, a magazine supported on the frame for holding a plurality of picture slides, a slide track mounted transversely of the front end of the magazine and adapted to receive slides as they are moved out of the magazine, and a post mounted on the frame in advance of the front end of the magazine and constituting a corner guide member for the slides at the entrance of the slide track, the front face of said post being reduced in thickness intermediate its ends to provide clearance to accommodate slides having warped intermediate portions and thereby prevent jamming of the slides as they are transferred from the magazine to the slide track.

19. In a device of the character described, a frame for supporting slide magazines, a slide track mounted at one end of the frame and adapted to receive slides from one magazine and guide them to the other magazine, a shelf carried by the frame in advance of the slide track, and a bar movably supported on said shelf and resiliently urged toward the track, whereby the bar will contact the slides and prevent lateral movement thereof as they pass through the track.

20. In a device of the character described, a frame for supporting slide magazines, a slide track mounted at one end of the frame and adapted to receive slides from one magazine and guide them to the other magazine, a shelf carried by the frame in advance of the slide track, a post mounted at the front of the shelf, a bar extending longitudinally of the shelf and provided with a pin engageable with an opening in the post, and a spring on the pin between the post and bar for urging the bar inwardly toward the track whereby the bar will contact the slides and prevent lateral movement thereof as they pass through the track.

21. In a device of the character described, a frame, a magazine supported horizontally on the frame for holding a plurality of picture slides, a slide track mounted transversely of the front end of the magazine and adapted to receive slides as they are moved out of the magazine, and means carried by the frame at the front of the magazine and above the normal path of the slides for limiting the height of the slides as they pass to the slide track.

22. In a device of the character described, a frame, a magazine supported horizontally on the frame for holding a plurality of picture slides, a slide track mounted transversely of the front end of the magazine and adapted to receive slides as they are moved out of the magazine, and a stop block mounted on the frame at the front of the magazine and above the normal path of the slides, said block having a downwardly and forwardly extending beveled surface adapted to contact the upper edge of a slide which has been accidentally raised and return the slide to its normal position prior to its movement into the slide track.

23. In a device of the character described, a frame having a magazine supporting platform and pairs of spaced front and rear plates extending upwardly from and longitudinally of said platform, and a slide retaining magazine comprising a tray of substantially channel-shape formation having a base and side walls open at opposite ends, said tray being detachably supported in the frame with its base supported on the platform and its sides positioned between and in overlapping engagement with the pairs of plates, whereby a filled tray may be quickly inserted and removed from the frame.

24. A magazine for use in a slide changing device, comprising a tray of substantially channel-shape formation having a base and side walls open at opposite ends and adapted to be detachably supported in said device, and a cover for said tray having a top and side walls adapted to overlap the side walls of the tray, said cover having depending end walls connected only to the top, and interengaging means on said tray and cover for locking the cover to the tray.

25. A spacer adapted to be inserted in a magazine of a slide changing device, comprising an extensible rod, and slide engaging heads secured to the ends of the rod, one of said heads being rotatably mounted on the rod whereby said spacer may be contracted or expanded while positioned in a magazine.

26. In a device of the character described, a frame for supporting slide magazines, a slide track mounted at one end of the frame and adapted to receive slides from one magazine and guide them to the other magazine, a shelf carried by the frame in advance of the slide track, and a plate adjustably mounted on the shelf in advance of the feed magazine and constituting an abutment for engaging a slide as it is moved from the front of said magazine to the slide track, the adjustability of said plate permitting the latter to accommodate slides of different thicknesses and take up clearance in the slide track.

27. In a slide changing apparatus, a magazine for holding a plurality of picture slides, a slide track mounted transversely of and connecting one end of the magazine, means for shifting the slides from the magazine to the slide track and then past a picture aperture, and means associated with said last-mentioned means for effecting a separating action between the front slide and the second slide in the magazine longitudinally of the magazine, as the front slide is moved out of the magazine into the slide track, whereby the front slide is permitted to move freely out of the magazine away from the second slide.

28. In a slide changing apparatus, a magazine for holding a plurality of picture slides, a slide track mounted transversely of and connecting one end of the magazine, a slide carrier associated with the magazine and slide track for transferring the front slide from the magazine to the track, and means carried by said slide carrier for transmitting a rocking action to the second slide in the magazine as the front slide is moved out of the magazine into the slide track, to thereby effect a separation of said slides longitudinally of the magazine and permit the front slide to move freely out of the magazine away from the second slide.

29. In a slide changing apparatus, a magazine for holding a plurality of picture slides, a slide track mounted transversely of and connecting one end of the magazine, a slide carrier associated with the magazine and slide track for transferring the front slide from the magazine to the track, and means carried by said slide carrier for transmitting a rocking action to the second slide in the magazine as the front slide is moved out of the magazine into the slide track, to thereby effect a separation of said slides longitudinally of the magazine and permit the front slide to move freely out of the magazine away from the second slide, said last-mentioned means also adapted to transmit a rocking action in varying degrees to slides in the magazine back of the second slide, whereby the slides are given a preliminary rocking movement to prevent adjacent slides from adhering to each other as they gradually approach the front of the magazine and the slide track.

30. In a slide changing apparatus, a magazine for holding a plurality of picture slides, a slide track mounted transversely of and connecting one end of the magazine, a slide carrier associated with the magazine and slide track for transferring the front slide from the magazine to the track, and cam mechanism mounted on said carrier for transmitting a rocking movement to the second slide in the magazine as the front slide is moved out of the magazine into the slide track to thereby effect a separation of said slides longitudinally of the magazine and permit the front slide to move freely out of the magazine away from the second slide.

JOSEPH A. DARWIN.